(12) United States Patent
Nakamura et al.

(10) Patent No.: US 8,179,745 B2
(45) Date of Patent: *May 15, 2012

(54) HEAD GIMBAL ASSEMBLY AND DISK DRIVE

(75) Inventors: Shigeo Nakamura, Kanagawa (JP);
Kimihiko Sudo, Kanagawa (JP); Irizo Naniwa, Kanagawa (JP); Shinobu Hagiya, Kanagawa (JP); Shigenori Takada, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 143 days.

This patent is subject to a terminal disclaimer.

(21) Appl. No.: 12/726,282

(22) Filed: Mar. 17, 2010

(65) Prior Publication Data

US 2010/0238581 A1   Sep. 23, 2010

(30) Foreign Application Priority Data

Mar. 17, 2009   (JP) .................................. 2009-064084

(51) Int. Cl.
*G11B 11/00* (2006.01)

(52) U.S. Cl. ................................ 369/13.33; 369/112.27

(58) Field of Classification Search ............... 369/13.33, 369/13.32, 13.24, 13.14, 13.03, 13.02, 13.12, 369/112.27, 112.09, 112.14, 112.21; 360/59, 360/313, 245.3, 126, 123.217, 125.31, 128, 360/125.74, 125.02
See application file for complete search history.

(56) References Cited

U.S. PATENT DOCUMENTS

| 7,242,132 | B2 * | 7/2007 | Hida et al. ................... 310/328 |
| 7,609,487 | B2 * | 10/2009 | Yao et al. ................... 360/294.1 |
| 7,974,043 | B2 * | 7/2011 | Shimazawa et al. ..... 360/125.31 |
| 2008/0055784 | A1 | 3/2008 | Shimazawa et al. |
| 2011/0149440 | A1 * | 6/2011 | Uematsu et al. ........... 360/245.3 |

FOREIGN PATENT DOCUMENTS

JP           2008152908       7/2008

* cited by examiner

*Primary Examiner* — Ali Neyzari

(57) ABSTRACT

A head gimbal assembly including a gimbal provided with a tongue comprising a stage; a sub-mount comprising a laser diode, wherein the laser diode is disposed internally in the sub-mount, and wherein the sub-mount is mounted on said stage; a head slider for thermally assisted recording, wherein the head slider is disposed on the sub-mount; a first piezoelectric element; a second piezoelectric element; and a plurality of lead wires.

20 Claims, 7 Drawing Sheets

HEAD GIMBAL ASSEMBLY AND DISK DRIVE

CROSS-REFERENCE TO RELATED APPLICATION

This application claims priority from the Japanese Patent Application No. 2009-064084, filed Mar. 17, 2009, the disclosure of which is incorporated herein in its entirety by reference.

BACKGROUND

The hard disk drive (HDD) has spread widely as a memory device in computers and has become one memory device which cannot be missing from current computer systems. In addition, the applications of HDDs, such as in dynamic image storage and playback devices, car navigation systems, or portable telephones, are even more widespread because of the superior characteristics of the HDD.

The magnetic disk used in an HDD has a plurality of data tracks and a plurality of servo tracks formed in concentric circles. A plurality of data sectors which include user data is provided in each data track. Each servo track has address information. A servo track is constructed from a plurality of servo data arranged separately in the circumferential direction, and one or a plurality of data sectors is formed between the servo data. A data write to a data sector and a data read from a data sector can be conducted when a head element accesses the desired data sector in accordance with the address information of the servo data.

A head element is formed on a slider, and the slider is secured onto the suspension of an actuator. The assembly of the actuator and the head slider is referred to as the head stack assembly (HSA). In addition, the assembly of the suspension and the head slider is referred to as the head gimbal assembly (HGA). The head slider can fly above a magnetic disk because the pressure due to the viscosity of the air between the slider air bearing surface opposite the magnetic disk and the rotating magnetic disk is balanced by the pressure applied in the direction of the magnetic disk by the suspension. The head slider moves to the target track and is positioned above that track when the actuator rotates with the rotation shaft at the center.

As the tracks per inch (TPI) of a magnetic disk increase, improved accuracy in positioning the head slider is sought. However, the drive of the actuator by a voice coil motor (VCM) has limited positioning accuracy. Thus, technology for a two-stage actuator has been proposed in which a small actuator (micro-actuator) is installed on the front end of the actuator, and more accurate positioning is carried out.

Furthermore, one technology for substantially improving the recording density and the bits per inch (BPI) in the circumferential direction of a magnetic disk is thermally assisted recording. Thermally assisted recording applies heat of at least 200° C. and a magnetic field to a very small region of approximately several tens of nanometers by several tens of nanometers on a magnetic disk, and records data on the magnetic disk. Using the conversion of laser light to near field light by a near field optical element positioned in the vicinity of the recording magnetic pole is being considered as a mechanism for heating this very small region. A laser diode (LD) which is positioned on the back side of the air bearing surface of the head slider with a sub-mount in between is being studied as the light source.

Figure 1:
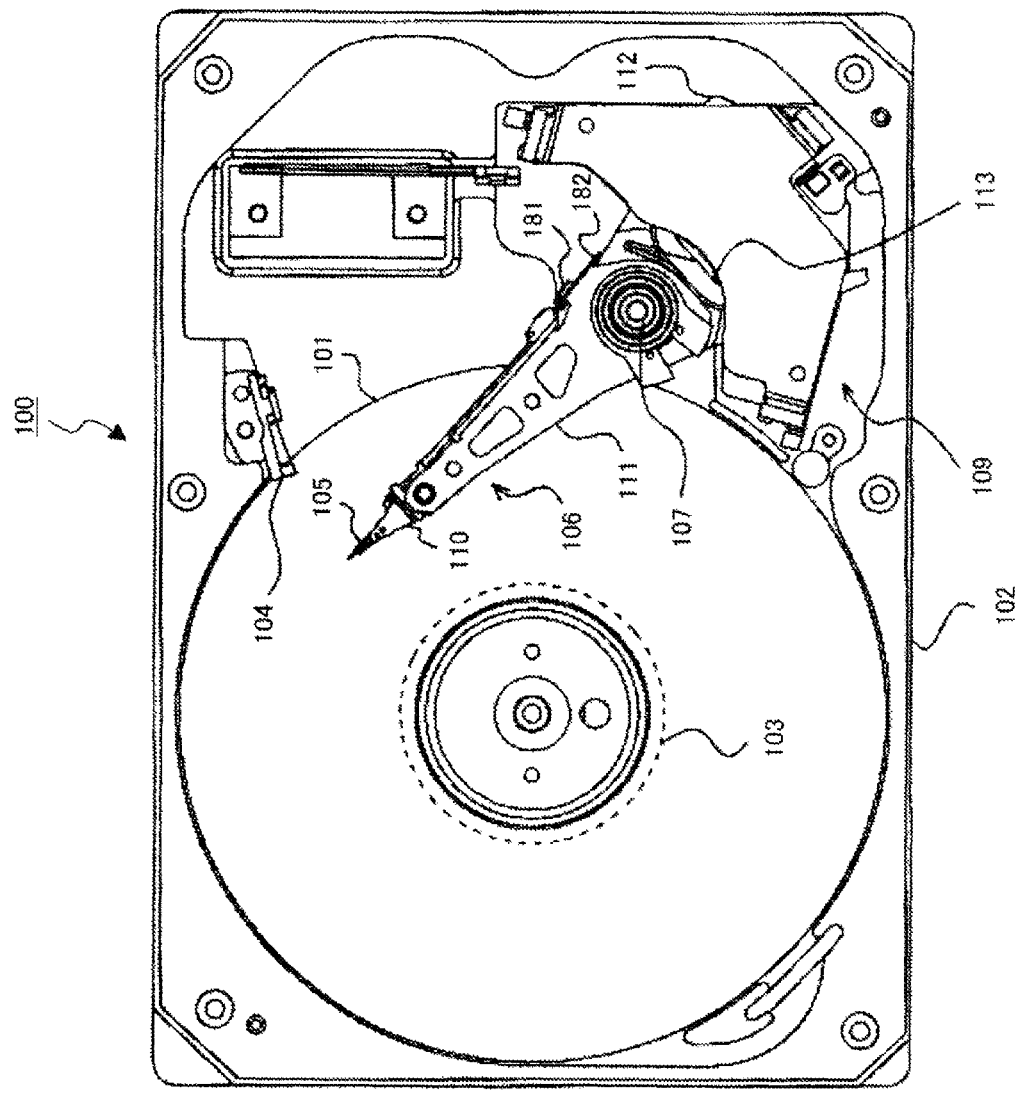
FIG. 1 illustrates an example of an HDD, in accordance with an embodiment of the present invention.

The drawings referred to in this description should be understood as not being drawn to scale except if specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following description of embodiments, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

To increase the recording capacity of an HDD (e.g., HDD 100), both the TPI and the BPI must be increased. Simultaneously employing more accurate positioning of the head slider by a two-stage actuator and thermally assisted recording is being considered. Therefore, mounting a micro-actuator and an LD in the HGA is under consideration.

When the LD (e.g., laser diode 401) for thermally assisted recording is positioned at a location away from the head slider (e.g., head slider 110), the problems are that an optical fiber/waveguide and mirrors, etc. for guiding the light must be used over long distances, and the light transmission efficiency decreases significantly, or that the structure of the entire device becomes complex. In order to solve these problems, the LD for thermally assisted recording is mounted on the back side of the air bearing surface of the head slider.

In an HGA (e.g., FIG. 2a-b) in which a sub-mount having an internally installed LD light source for the thermally assisted recording is positioned on the back surface of the head slider, as described above, the micro-actuator is capable of accurately positioning the head slider through fine motions. However, when the micro-actuator is installed on the suspension without modifying the structure of a conventional suspension, a substantial improvement is not seen in the positioning accuracy of the head slider. The reason is the deterioration in the suspension's characteristics due to the micro-actuator.

One reason is the deterioration in the windage vibration characteristics of the suspension caused by the increase in the mass and the volume due to the micro-actuator. Another reason is the excitation of many suspension drive modes accompanying the drive (vibration) of the micro-actuator. In addition, the shock-resistance characteristics and the load/unload characteristics of the suspension (e.g., 110) worsen because of the increase in mass due to the micro-actuator.

In one embodiment, a micro-actuator is constructed so that the sub-mount (e.g., 400) and the head slider are rotated by piezoelectric elements (e.g., 205a and 205b) secured inside of a gimbal tongue (e.g., 223). In an HGA having this micro-actuator, the gimbal tongue has a stage on the trailing side, the sub-mount is secured with an adhesive agent to the stage, and the head slider is secured thereon by the adhesive agent. Two piezoelectric elements are secured inside of the gimbal tongue on the leading side of the head slider.

The two piezoelectric elements are arranged in a line in the direction of rotation of the actuator and expand and contract along the forward-backward direction of the suspension (flying direction of the head slider). The piezoelectric elements on the left and the right expand and contract in opposition to rotate the stage. The sub-mount and the head slider secured thereon also rotate. The rotation of the head slider enables fine motions in the radial direction of the magnetic disk of the head element (thin-film head).

The placement of the two piezoelectric elements inside of the gimbal tongue limits the deterioration in the characteristics of the suspension described above. However, the motions of the piezoelectric elements in the gimbal tongue can be greatly affected by the wiring (trace) formed on the suspension. The trace (e.g., 201) is formed from a plurality of lead wires (e.g., 217a-217j) in which the signals of the head slider are transmitted through the sub-mount, one or a plurality of lead wires for driving the actuator which controls the flying amount embedded in the head slider, one or a plurality of lead wires for driving the LD installed in the sub-mount, and the resin layer for protecting the wires. When the head slider is rotated by the expansion and contraction of the piezoelectric elements on the left and the right, the rigidity of the trace impedes the motion of the piezoelectric elements, and the amount of rotation of the sub-mount and the head slider is reduced corresponding to the amount of expansion and contraction of the piezoelectric elements.

Consequently, in one embodiment, the structure of the HGA can suppress the undesired effects caused by the trace rigidity on the expansion and contraction of the two piezoelectric elements mounted in the gimbal tongue and the resultant rotation of the head slider.

The LD is a laser light source and is simultaneously a heat-generating source. When the piezoelectric elements are driven continuously under high temperatures, a problem is the displacement which is produced will decrease. To prevent this, in one embodiment, the structure of the HGA hampers the transmission of the heat generated by the LD to the piezoelectric elements.

In various embodiments, head gimbal assembly (e.g., FIG. 2) of the present invention comprises: a gimbal provided with a tongue which has a stage; a sub-mount with a laser diode installed internally which is mounted on the stage; a head slider for thermally assisted recording which is installed on the sub-mount; a first piezoelectric element which expands and contracts in the forward-backward direction, is positioned on the back side opposite the sub-mount installation surface of the stage in the tongue, and has a front connecting pad and a back connecting pad; a second piezoelectric element which expands and contracts in the forward-backward direction, is positioned on a line with the first piezoelectric element on the back side opposite the sub-mount installation surface of the stage in the tongue, and has a front connecting pad and a back connecting pad; and a plurality of lead wires formed on top of the gimbal which have one end connected to a connecting pad of the sub-mount, separate to the left and the right in front of the sub-mount, detour around the installation region of the sub-mount and advance to the back, pass between the installation region of the sub-mount and the front connecting pad of the first piezoelectric element and the front connecting pad of the second piezoelectric element and advance to the center, and pass between the front connecting pad of the first piezoelectric element and the front connecting pad of the second piezoelectric element and advance to the back.

In various embodiments, a disk drive comprises: a spindle motor; a magnetic disk which is mounted on the spindle motor; and a head gimbal assembly in which recording and reproducing are carried out at any position of the magnetic disk rotated by the spindle motor; wherein the head gimbal assembly has a gimbal provided with a tongue which has a stage; a sub-mount with a laser diode installed internally which is mounted on the stage; a head slider for thermally assisted recording which is installed on the sub-mount; a first piezoelectric element which expands and contracts in the forward-backward direction, is positioned on the back side opposite the sub-mount installation surface of the stage in the tongue, and has a front connecting pad and a back connecting pad; a second piezoelectric element which expands and contracts in the forward-backward direction, is positioned on a line with the first piezoelectric element on the back side opposite the sub-mount installation surface of the stage in the tongue, and has a front connecting pad and a back connecting pad; and a plurality of lead wires formed on top of the gimbal which have one end connected to a connecting pad of the sub-mount, separate to the left and the right in front of the sub-mount, detour around the installation region of the sub-mount and advance to the back, pass between the installation region of the sub-mount and the front connecting pad of the first piezoelectric element and the front connecting pad of the second piezoelectric element and advance to the center, and pass between the front connecting pad of the first piezoelectric element and the front connecting pad of the second piezoelectric element and advance to the back.

According to various embodiments, in the HGA in which piezoelectric elements are secured inside of the gimbal tongue, the negative effects of the trace on the rotation of the head slider by the expansion and contraction actions of the piezoelectric elements can be suppressed. Further, the increase in temperature of the piezoelectric elements caused by the heat generated by the LD arranged on the back surface of the head slider via the sub-mount can be suppressed. As a result, an HGA for thermally assisted recording which is provided with an actuator in which a slider drives the piezoelectric elements can be realized.

The HDD in one embodiment is provided with a two-stage actuator which has a positioning mechanism based on a voice coil motor and a positioning mechanism (micro-actuator) based on the piezoelectric elements on a suspension. The micro-actuator of this embodiment has two piezoelectric elements which are secured in a gimbal tongue. The two piezoelectric elements are arranged in a line in the direction of rotation (left-right direction) of the actuator and expand and contract along the forward-backward direction of the suspension (flying direction of the head slider).

The gimbal tongue has a stage on the trailing side. The sub-mount and the thermally assisted recording head slider (head slider) are secured by an adhesive agent on top of the stage. The stage is rotated by the opposing expansion and contraction actions of the left and the right piezoelectric elements. The sub-mount having an internally installed LD secured thereon and the head slider which is secured on the sub-mount rotate, also. Fine motions are possible in the radial direction of the magnetic disk of the head element (thin-film head) by the rotation of the head slider.

A feature of the HGA of this embodiment is that the lead wires for transmitting the signals of the head slider and the lead wires for driving the LD extend between the connecting pads on the head slider side of the two piezoelectric elements from the connecting pads for connecting to the head slider. Thus, stress caused by the trace rigidity on the expansion and contraction of the piezoelectric elements is reduced, and the decrease in the stroke of the piezoelectric elements is suppressed. In addition, the head slider can be rotated by the smooth expansion and contraction of the piezoelectric elements. Thus, slider drive displacement is increased, and highly accurate head positioning can be achieved.

In reference to FIG. 1, the mechanical structural elements of the HDD 100 are housed in a base 102. Each structural element in the base 102 is controlled by a control circuit (not shown) on a circuit board secured outside of the base. The HDD 100 has a magnetic disk 101 which is the disk for storing data, and a thermally assisted recording head slider 105 (head slider) for accessing (read or write) the magnetic disk 101. The head slider 105 is provided with a head element for writing and/or reading user data to and from the magnetic disk 101, and a slider which has the head element is formed on the surface thereof.

An actuator 106 holds the head slider 105. To access the magnetic disk 101, the actuator 106 rotates with a rotation shaft 107 at the center and moves the head slider 105 above the rotating magnetic disk 101. A voice coil motor (VCM) 109, which is the drive mechanism, drives the actuator 106. The actuator 106 is provided with the structural elements which combine a suspension 110, an arm 111, a coil support 112, and a VCM coil 113 in the lengthwise direction from the front end where the head slider 105 is positioned.

The magnetic disk 101 is installed on a spindle motor (SPM) 103 secured to the base 102, and the magnetic disk 101 is rotated at a predetermined angular speed. The head slider 105 flies above the magnetic disk 101 because the pressure caused by the viscosity of the air between the air bearing surface of the slider opposite the magnetic disk 101 and the rotating magnetic disk 101 is balanced by the pressure applied in the direction of the magnetic disk 101 by the suspension 110. In FIG. 1, the magnetic disk 101 rotates counter-clockwise. The signals of the head slider 105 and the signals of the piezoelectric elements of the micro-actuator are amplified by a pre-amplifier IC 181 which is close to the rotation shaft of the actuator 106. The pre-amplifier IC 181 is mounted on a substrate 182.

When the head slider 105 is not accessing, the actuator 106 rests above a ramp 104 which is outside of the magnetic disk 101. The motion operation from above the magnetic disk to the ramp 104 of the actuator 106 is referred to as unload. The motion operation from the ramp 104 to above the magnetic disk is referred to as load. Various embodiments of the present invention are utilized in an HDD having ramp load/unload, but can be applied to an HDD in which the actuator 106 moves to the inner circumferential region of the disk when not accessing and the ramp 104 is not present.

Figure 2A:
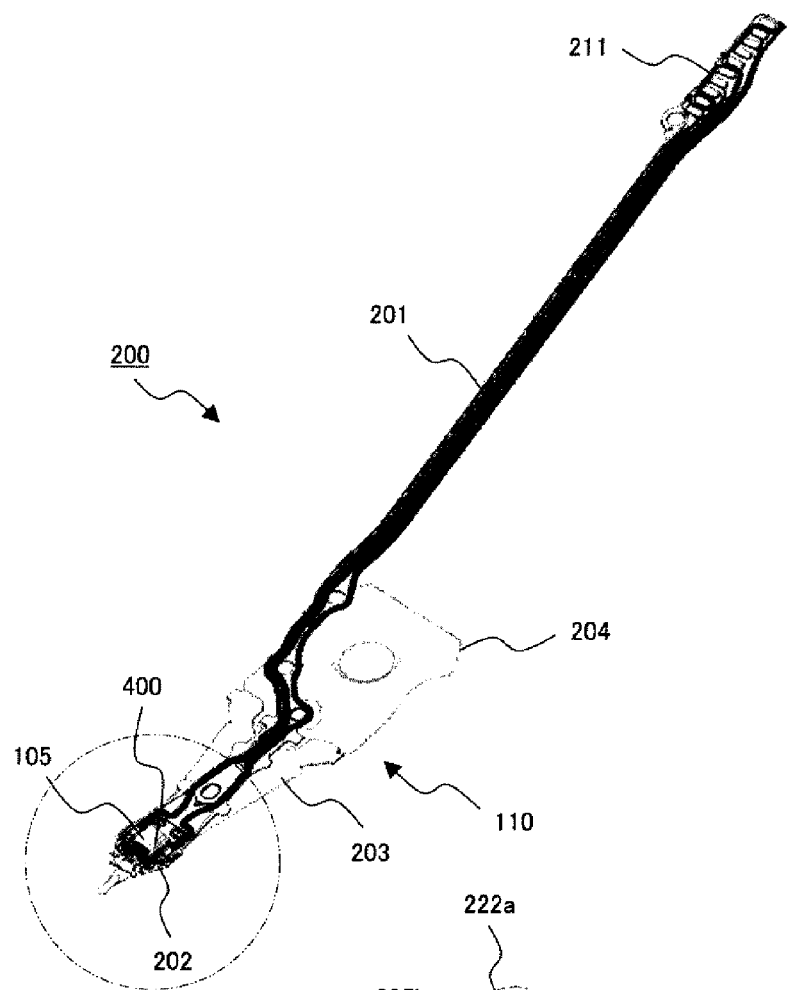
FIGS. 2a-b illustrate examples of an HGA, in accordance with embodiments of the present invention.
Figure 2B:
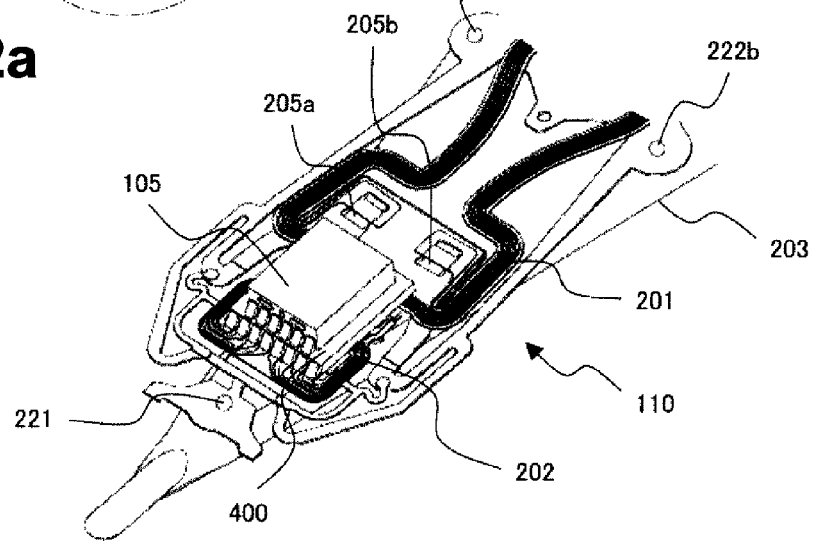

FIG. 2a is a perspective view showing the structure of an HGA 200 according to this embodiment and is a view of the HGA 200 seen from the disk side. FIG. 2b is an enlarged view of the part enclosed by the circle in FIG. 2a. As shown in FIG. 2a, the HGA 200 has a suspension 110, a thermally assisted recording head slider (head slider) 105, and a sub-mount 400 with an LD installed internally. The suspension 110 has a trace 201, a gimbal 202, a load beam 203, and a mounting plate 204.

The load beam 203 is the reference, and the gimbal 202 is secured onto the load beam, and the trace 201 is formed on the gimbal 202. The head slider 105 is secured to the sub-mount 400. The sub-mount 400 is secured to the same surface as the trace 201 on the gimbal 202. As shown in FIG. 2b, the HGA 200 has piezoelectric elements 205a, 205b which constitute a part of the micro-actuator. The piezoelectric elements 205a, 205b are secured to the back side of the surface securing the head slider 105 with the sub-mount 400 of the suspension 110 therebetween.

The load beam 203 is a precision thin-plate spring and is formed from stainless steel, etc. The rigidity of the load beam is higher than that of the gimbal 202. The load beam 203 produces a load on the head slider 105 through the sub-mount 400 because the beam has elasticity. For example, the mounting plate 204 and the gimbal 202 are formed from stainless steel (SUS). The head slider 105 is secured on the gimbal 202 with the sub-mount 400 therebetween. The gimbal 202 is elastically supported and holds the head slider 105 with the sub-mount 400 therebetween and contributes to attitude control of the head slider 105 because of the unrestricted tilting of the gimbal.

As shown in FIG. 2b, the gimbal 202 in the HGA 200 of this embodiment joins to the load beam 203 at a point 221 in front of and points 222a, 222b behind the head slider 105. The joining is typically by laser spot welding. Thus, HGA 200 can obtain excellent load/unload characteristics (peel characteristics) by joining the gimbal 202 to the load beam 203 at both the positions in front of and behind the head slider 105.

The terminals at one end of the trace 201 having a plurality of lead wires are connected to the piezoelectric elements 205a, 205b and the head slider 105. The terminals at the other end gather at a multi-connector 211 and are connected to a substrate 182 secured to the actuator 106. In this example of the structure, the multi-connector 211 has ten connecting pads which are for read signals, write signals, signals of the heater element for clearance adjustments, signals of the two piezoelectric elements 205a, 205b, and signals for the laser diode (LD). The number of connecting pads varies with the structures of the sub-mount 400 and the head slider 105, and the control method for the piezoelectric elements 205a, 205b.

As shown in FIG. 1, an amplifier circuit 181 for the signals of the head slider element (read element and write element) and the piezoelectric elements 205a, 205b is mounted on the substrate 182. The trace 201 transmits the signals for controlling (driving) the piezoelectric elements 205a, 205b in addition to the read signals and the write signals. In this embodiment, the connection direction of the front end of the actuator 106 (suspension 110) and the rotation shaft 107 is the forward-backward direction, and the direction parallel to the main surface (recording surface) of the magnetic disk 101 and perpendicular to the forward-backward direction (direction of rotation of the actuator 106) is the left-right direction.

Figure 3A:
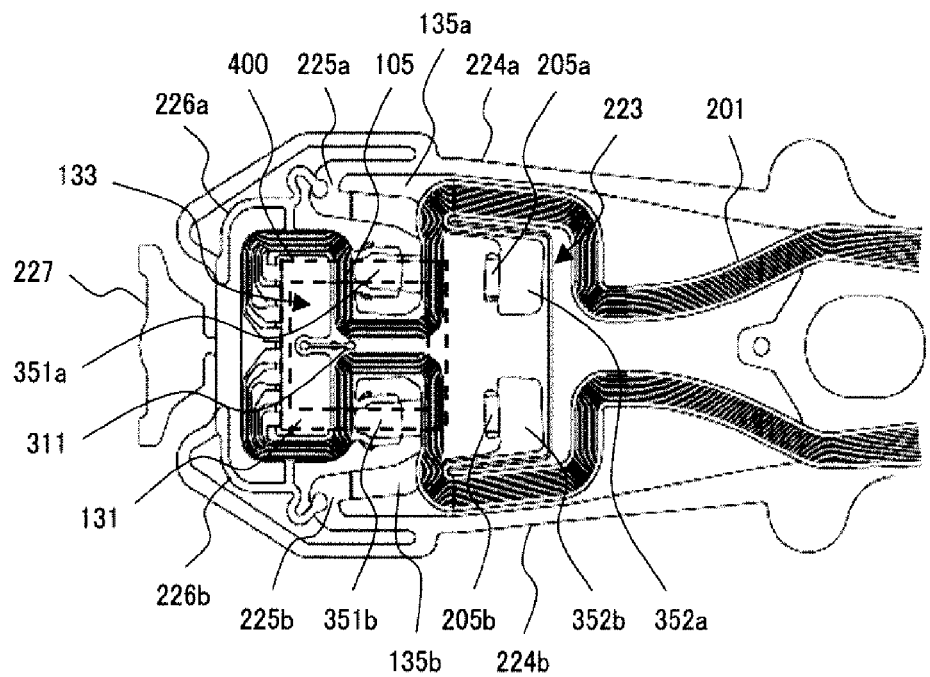
FIGS. 3a-b illustrate examples of a head slider and piezoelectric elements and the peripheral structures thereof, in accordance with embodiments of the present invention.
Figure 3B:
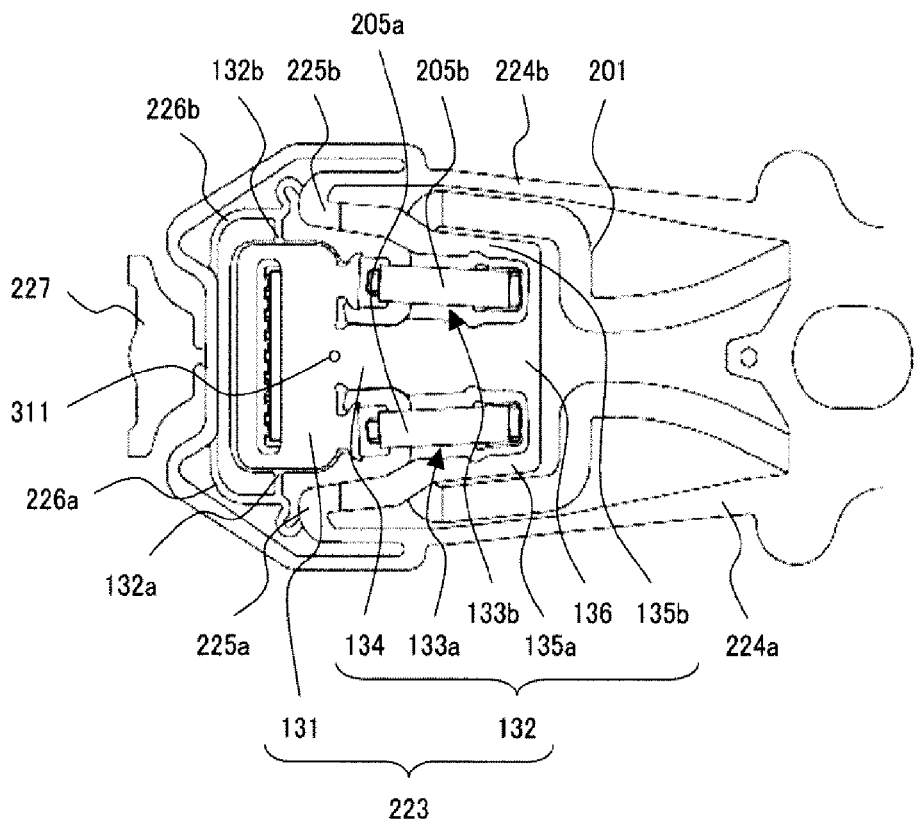

FIGS. 3a-b are top views showing the head slider 105, the piezoelectric elements 205a, 205b, and the peripheral structures in the HGA 200 of this embodiment. The load beam 203 is omitted from FIGS. 3a-b. FIG. 3a is a view of the HGA 200 seen from the magnetic disk side (head slider side). FIG. 3b is a view seen from the opposite side. In FIG. 3a, the sub-mount 400 and the head slider 105 are indicated by dashed lines and drawn as transparent objects.

As described with reference to FIGS. 2a-b, the trace 201 and the sub-mount 400 are arranged on the same surface of the gimbal 202. In FIG. 3a, the trace 201 and the head slider 105 are shown above the gimbal 202. In FIG. 3b, the gimbal 202 is shown above the trace 201. As shown in FIG. 3b, the piezoelectric elements 205a, 205b are arranged on the trace 201 on the side opposite the sub-mount 400 and the head slider 105.

The gimbal 202 has a gimbal tongue 223 in the center, and side arms 224a, 224b which are separated and extend in the forward-backward direction from the gimbal tongue 223 on both the left and the right sides of the gimbal tongue 223. The gimbal tongue 223 is connected to the side arms 224a, 224b by the left and right connector tabs 225a, 225b.

The gimbal tongue 223 has a stage 131 and a support member 132 which is connected to the stage 131 on the back side of the stage 131 (leading side) to support the stage 131. The support member 132 has two slits 133a, 133b which extend in the forward-backward direction. The slits 133a, 133b are arranged in the left-right direction. The piezoelectric elements 205a, 205b are arranged inside of the slits 133a, 133b, respectively. The piezoelectric elements 205a, 205b expand and contract in mutually opposing actions in the forward-backward direction, and rotate the stage 131, the sub-mount 400 thereon, and the head slider 105.

The support member 132 is constructed from a center member 134 between the slits 133a, 133b, a side member 135a between the piezoelectric element 205a and the side arm 224a, and a side member 135b between the piezoelectric element 205b and the side arm 224b. The center member 134, side member 135a, and side member 135b are connected to the back end (base) 136. The side member 135a is connected to the side arm 224a by the connector tab 225a. The side member 135b is connected to the side arm 224b by the connector tab 225b. In addition, the front end (trailing end) of the center member 134 is connected to the back end (leading end) of the stage 131.

The sub-mount 400 which secures the head slider 105 is arranged and installed on top of the stage 131. In one embodiment, the sub-mount 400 is attached and secured to the stage 131 by an adhesive agent coated on the stage 131. In FIG. 3a, the sub-mount 400 is installed by an adhesive agent in an adhesion region (installation region) 133. Thus, the sub-mount 400 can be strongly secured to the gimbal tongue 223. Since the peel stiffness of the HGA 200 increases, the stage 131 is connected to the side arms 224a, 224b by left and right polyimide limiters 226a, 226b. The polyimide limiters 226a, 226b can be simultaneously formed with the polyimide layer of the trace 201.

The side arms 224a, 224b are connected in front of the stage 131. In addition, the support plate 227 is connected to the front ends of the side arms 224a, 224b. The support plate 227 is joined to the load beam 203. The load beam 203 which has a higher rigidity than the gimbal 202 supports the side arms 224a, 224b. Furthermore, the side arms 224a, 224b support the stage 131 and the head slider 105 thereon by the polyimide limiters 226a, 226b.

The gimbal tongue 223 is supported by the polyimide limiters 226a, 226b in front of the head slider 105. Excessive deformation of the gimbal tongue 223 (gimbal 202) in the pitch direction can be prevented. In addition, in this type of limiter structure, the limiters (stainless steel limiters) do not have to be formed in the gimbal, and a reduction in the windage vibrations caused by the reduction in mass can be achieved. Furthermore, the bending load applied to the piezoelectric elements 205a, 205b during a collision can be reduced because the limiters are on the side opposite the piezoelectric elements 205a, 205b with respect to the head slider 105 (stage 131).

Figure 4:
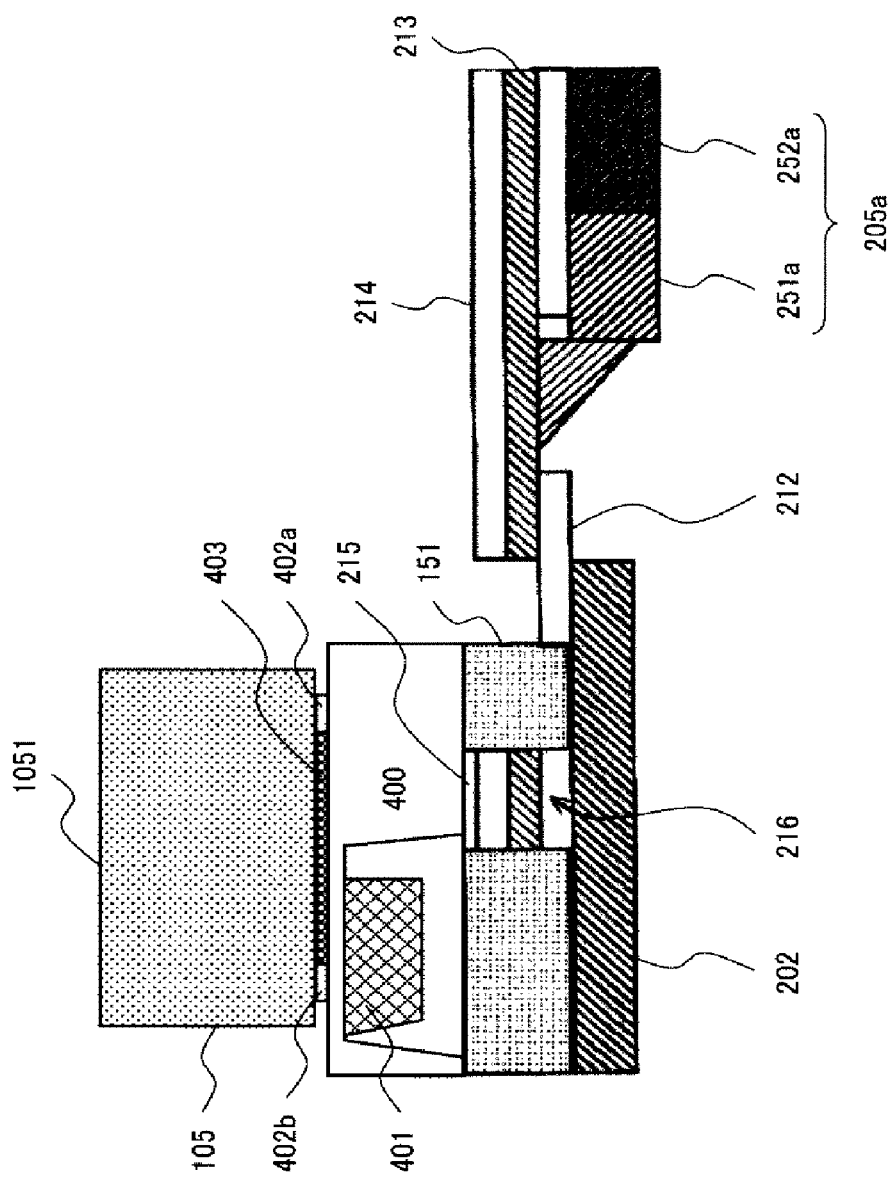
FIG. 4 illustrates a cross-sectional view of the layered structure of the HGA, in accordance with an embodiment of the present invention.

As shown in FIG. 3b, the piezoelectric elements 205a, 205b are connected from the side opposite the head slider 105 to the trace 201. FIG. 4 schematically shows the layered structure of the HGA 200 of this embodiment. A polyimide lower layer 212 which forms the trace 201, a conductor layer 213, a polyimide first upper layer 214, and a polyimide second upper layer 215 are successively layered on the stainless steel layer 202 of the gimbal. The structure of the suspension 110 is formed into the desired shape by etching each layer on the substrate having the layered structure above.

The conductor layer 213 is typically a copper layer and forms the lead wires in which the signals of the head slider 105 and the piezoelectric elements 205a, 205b are transmitted through the sub-mount 400. The polyimide lower layer 212 is the insulating layer between the conductor layer 213 and the stainless steel layer of the gimbal 202, and the polyimide first upper layer 214 is the protective layer of the conductor layer 213. The polyimide second upper layer 215 is the stud layer which supports the sub-mount 400 and is described later.

In FIG. 4, the head slider 105 is secured by an adhesive agent 403 to the sub-mount 400. The head slider 105 is positioned on the sub-mount studs 402a, 402b which are formed as a unit with the sub-mount 400 to determine height position.

The sub-mount 400 is arranged so that the laser diode (LD) 401 in the center emits laser light onto the head slider 105. The LD 401 and the sub-mount 400 are secured by solder or an electrically conductive adhesive agent.

The sub-mount 400 is secured by an adhesive agent 151 to the top of the stainless steel layer 202. Specifically, the sub-mount 400 is secured by an adhesive agent to the stainless steel layer 202 which was exposed by the removal of the polyimide second upper layer 215, the polyimide first upper layer 214, the conductor layer 213, and the polyimide lower layer 212. The exposed stainless steel layer 202 corresponds to the stage 131 in FIG. 3a. Three or more studs which have the same structure as the stud 216 are formed on the stainless steel layer 202. The sub-mount 400 is positioned on the studs to determine the height position. Typically, two studs are formed on the stage 131 and one stud is formed off the stage 131.

The piezoelectric elements 205a, 205b are connected to the trace 201 on the side opposite the head slider 105 and the sub-mount 400. FIG. 4 shows the connecting pad 251a and the main body 252a of the piezoelectric element 205a. The piezoelectric element 205a is secured onto the trace 201 exposed through the stainless steel layer 202. Specifically, the connecting pad 251a is electrically and physically connected by a solder connection to the conductor layer 213 which is exposed through the stainless steel layer 202 and the polyimide lower layer 212.

In reference to FIG. 4, in various embodiments, there are many parts between the laser diode 401 and the piezoelectric element 205a. These parts are constructed from materials having low thermal conductivity such as the polyimide lower layer 212, the polyimide second upper layer 215, the stainless steel layer 202, and the adhesive agent 151. The heat generated by the laser diode 401 is difficult to transmit to the piezoelectric element 205a. The sub-mount 400 and the sub-mount studs 402a, 402b are on one side or from the laser diode 401 to the head slider 105. The number of parts is small. In addition, the sub-mount 400 and the sub-mount studs 401a, 401b are formed from materials having high thermal conductivity such as silicon. Further, the air bearing surface 1051 of the head slider 105 has good heat dissipation characteristics because an extremely small gap is maintained with the opposite surface of the rotating magnetic disk 101. Consequently, a lot of the heat generated by the laser diode 401 is dissipated through the head slider 105 to the magnetic disk 101, and is hard to transmit to the piezoelectric element 205a. Thus, a temperature increase in the piezoelectric element 205a caused by heat generated by the laser diode 401 can be suppressed.

As shown in FIGS. 3a-b, each piezoelectric element 205a, 205b has a front connecting pad and a back connecting pad. These pads are soldered to the connecting pads 351a, 351b, 352a, 352b of the conductor layer 213 which is exposed through the polyimide lower layer 212. In order to not hinder the expansion and contraction of the piezoelectric elements 205a, 205b, in various embodiments, the piezoelectric elements 205a, 205b are not affixed to the polyimide lower layer 212 and are separated.

Also, the stage 131 is connected to the piezoelectric elements 205a, 205b through the trace 201. The expansion and contraction of the piezoelectric elements 205a, 205b cause the stage 131 to rotate about the center of rotation 311. The mutually opposing expansion and contraction of the piezoelectric elements 205a, 205b can substantially increase the amount of rotation of the stage 131.

Figure 5A:
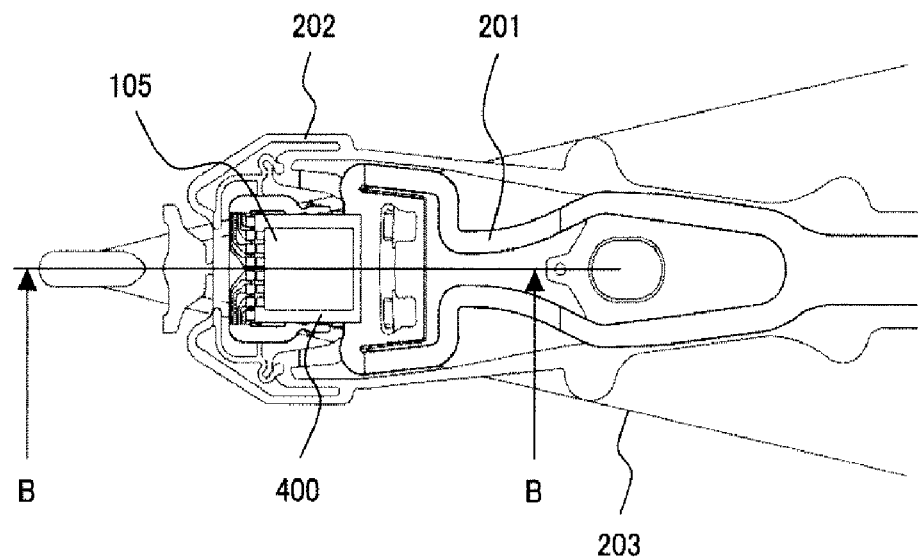
FIGS. 5a-b illustrate a top view and a cross-sectional view of the HGA, in accordance with embodiments of the present invention.
Figure 5B:
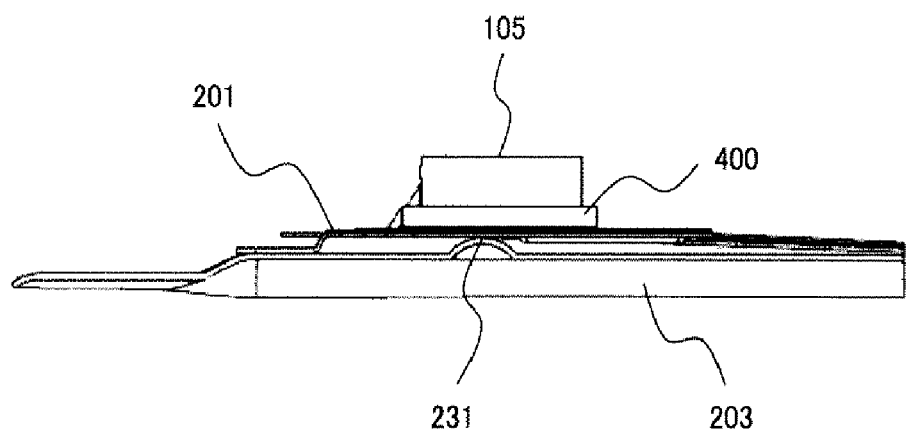

In one embodiment, the contact point of the dimple of the load beam 203 and the gimbal 202 coincides with the center of rotation 311 of the stage 131. FIG. 5b is a cross-sectional view along the B-B cut line in FIG. 5a. The B-B cut line is the center line extending in the lengthwise direction of the suspension 110.

As shown in FIG. 5b, the load beam 203 has a dimple 231 which projects toward the gimbal 202. The dimple 231 has a curved surface, and the apex of the curved surface is in contact with the gimbal 202. As described above, the contact point of the dimple 231 and the center of rotation 311 of the stage 131 coincide. The center of rotation 311 is on the side of the stage of the center member 134 in the support member 132 shown in FIG. 3. The position of the dimple and the center of rotation 311 coincide, and the stage 131 and the head slider 105 and the sub-mount 400 on the stage can smoothly rotate.

Figure 6:
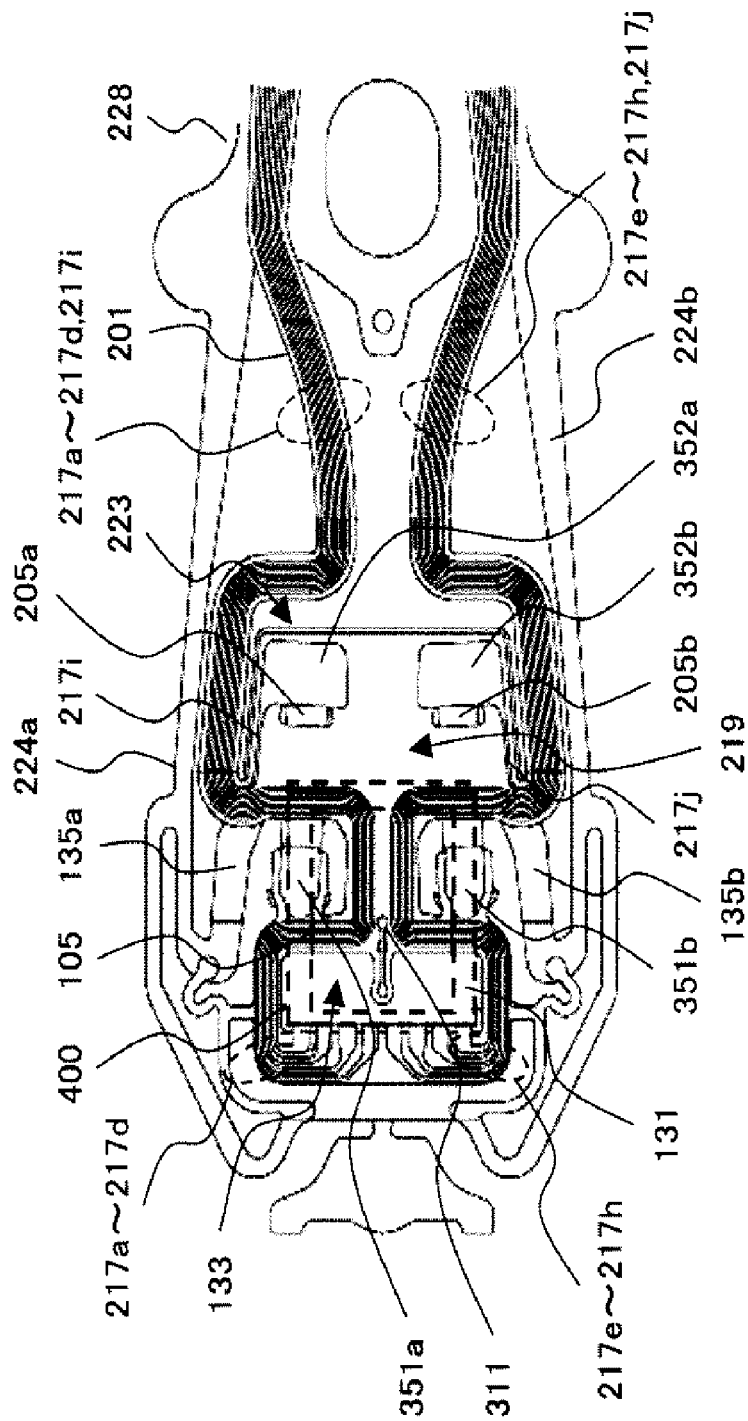
FIG. 6 illustrates a top view of the structures of the head slider, piezoelectric elements, and trace in the HGA, in accordance with embodiments of the present invention.

FIG. 6 is the same view as in FIG. 3a with other reference numbers. As shown in FIG. 6, the head slider 105 has a plurality of connecting pads arranged in the left-right direction on the front end surface (trailing end surface).

These connecting pads are connected to the connecting pads of the trace 201 which are formed on the stage 131. Typically, these pads are connected together with solder connections. In this example structure, eight connecting pads are formed and correspond to read signals, write signals, signals (power) of the heater element, and signals of the laser diode (LD).

The trace 201 has ten lead wires 217a-217j which are arranged at intervals in the plane. Eight of these wires are connected to the above-mentioned eight connecting pads. Lead wires 217a-217h transmit the corresponding signals of the connecting pads of the head slider 105 between the pre-amplifier IC and the head slider 105, and the corresponding signals of the connecting pads of the LD 401 between the LD driver and the LD 401 through the sub-mount 400 in both cases. In FIG. 6, the lead wires 217a-217h of the sub-mount 400 are directed toward the front from the connecting pads on the stage 131. Half of the lead wires 217a-217d on the right side is directed toward the right side, and half of the lead wires 217e-217h on the left side is directed toward the left side.

The lead wires 217a-217d pass between the right edge 132a of the stage 131 (see FIG. 3b) and the adhesion region 133 of the sub-mount 400, advance toward the back, bend toward the inside, and enter from below the sub-mount 400. The lead wires 217e-217h pass between the left edge 132b of the stage 131 (see FIG. 3b) and the adhesion region 133, advance toward the back, are directed toward the inside, and enter from below the sub-mount 400.

The lead wires 217a-217h pass between the sub-mount 400 and the stainless steel layer 202 (below the head slider 105) along the back edge of the adhesion region 133 toward the center of the gimbal tongue 223 (center line extending in the forward-backward direction). In the example in FIG. 3a, the lead wires 217a-217h advance toward the center of rotation 311 of the head slider 105 (stage 131) and merge close to the center of rotation 311 and advance toward the back.

When the lead wires 217a-217h can pass below the sub-mount 400, the lead wires 217a-217h can gather at the center as far in front as possible, and the stress which hinders the expansion and contraction of the piezoelectric elements 205a, 205b can be reduced. Since the adhesion region 133 is large, the center of rotation 311 is close to the back end of the adhesion region, but the center of rotation 311 may be further back than the position in the drawing.

When the lead wires 217a-217d enter the inside and advance toward the center of rotation 311, the lead wires 217a-217d pass above the stage 131 and between the connecting pad 351a of the trace 201, which is connected to the front connecting pad of the piezoelectric element 205a, and the adhesion region 133, and are directed toward the center of rotation 311. The lead wires 217e-217h pass above the stage 131 and between the connecting pad 351b, which is connected to the front connecting pad of the piezoelectric element 205b, and the adhesion region 133, and are directed toward the center of rotation 311.

In other words, the lead wires 217a-217d pass between the front connecting pad of the piezoelectric element 205a and the adhesion region 133, and the lead wires 217e-217h pass between the front connecting pad of the piezoelectric element 205b and the adhesion region 133. Thus, the lead wires 217a-217h gather at the center in front of the piezoelectric elements 205a, 205b, and the stress which hinders the expansion and contraction of the piezoelectric elements 205a, 205b can be reduced. In addition, the lead wires 217a-217h can pass close to the center of rotation 311, and the stress which hinders the expansion and contraction of the piezoelectric elements 205a, 205b can be reduced.

The lead wires 217a-217h, which merge in the vicinity of the center of rotation 311, pass between the front connecting pad (connecting pad 351a of the trace) of the piezoelectric element 205a and the front connecting pad (connecting pad 351b of the trace) of the piezoelectric element 205b, and advance toward the back. After passing between the pads, the lead wires 217a-217h separate to the left and the right. The lead wires 217a-217d advance in parallel to the right side and emerge from the gimbal tongue 223 (support member 132) (also see FIG. 3b). In addition, lead wires 217e-217h advance in parallel to the left side and emerge from the gimbal tongue 223 (support member 132) (also see FIG. 3b).

The lead wires 217a-217d bend in front of the side arm 224a and advance toward the back along the side arm 224a on the inside of the side arm 224a. In addition, lead wire 217i of the connecting pad 352a of the trace 201 which is connected to the back connecting pad of the piezoelectric element 205a merges with the lead wires 217a-217d. The lead wires 217e-217h bend in front of the side arm 224b and advance toward the back along the side arm 224b on the inside of the side arm 224b. And the lead wire 217j of the connecting pad 352b of the trace 201 which is connected to the back connecting pad of the piezoelectric element 205*b* merges with the lead wires 217*e*-217*h*.

The lead wires 217*a*-217*d*, 217*i* extend along the side arm 224*a* behind the suspension 110 and pass between the back connecting pad (connecting pad 352*a*) of the piezoelectric element 205*a* and the side arm 224*a*. The lead wires 217*a*-217*d*, 217*i* bend toward the inside, pass the back side of the back connecting pad (connecting pad 352*a*) of the piezoelectric element 205*a*, and are directed toward the center of the suspension 110 (center line extending in the forward-backward direction).

Similarly, the lead wires 217*e*-217*h*, 217*j* advance along the side arm 224*b* behind the suspension 110 and pass between the back connecting pad (connecting pad 352*b*) of the piezoelectric element 205*b* and the side arm 224*b*. The lead wires 217*e*-217*h*, 217*j* bend toward the inside, pass the back side of the back connecting pad (connecting pad 352*b*) of the piezoelectric element 205*b*, and are directed toward the center of the suspension 110.

Then, the lead wires 217*a*-217*j* bend toward the back of the suspension 110, advance toward the back of the suspension 110, and reach the main body 228 of the gimbal 202 which supports the side arms 224*a*, 224*b*. As shown in FIG. 3*b*, the part from where the lead wires 217*a*-217*j* emerge from the gimbal tongue 223 until reaching the gimbal main body 228 is not on the stainless steel layer and floats in the air (flying trace member). Then, as shown in FIG. 2, the lead wires 217*a*-217*j* pass over the tail from the gimbal main body 228 and connect to each of the connecting pads of the multi-connector 211.

Thus, the lead wires 217*a*-217*j* spread to the outer sides between the front and back connecting pads of the piezoelectric elements 205*a*, 205*b*. An increase in the rigidity of the gimbal 202 is suppressed. The drop in the tracking performance to changes in the flying attitude of the head slider 105 of the gimbal tongue 223 is limited.

In the trace 201, the conductor layer 213 is covered by the upper and lower polyimide layers 212, 214 and is not exposed except in parts in which the connecting pads are formed. Consequently, in the description of the routing of the lead wires 217*a*-217*j*, the polyimide layers 212, 214 are arranged in the region surrounding the lead wires 217*a*-217*j*. This is the same for the lead wires 217*a*-217*j* formed on the stainless steel layer 202 and the flying trace member.

In an embodiment, shown in FIG. 6, the lead wires 217*a*-217*j* (trace 201) extend between the two side arms 224*a*, 224*b* from the connecting pads with the sub-mount 400 until reaching the gimbal main body 228, and do not emerge outside of the arms. Because of this structure, the windage vibrations of the gimbal 202 due to vibrations of the trace 201 are suppressed, and improved reliability and an appropriate gimbal rigidity can be obtained because of the back end support of the gimbal tongue 223. In addition, the trace 201 is close to the center of the suspension, and the inertial moment in the twisting direction of the suspension becomes small, and the motion characteristics of the HGA improve.

As shown in FIG. 6, the trace 201 has one sheet member 219 which is stacked on the leading side of the gimbal tongue 223 (support member 132). The leading end of the sheet member 219 roughly coincides with the leading end of the gimbal tongue 223. The sheet member 219 has sheet-like polyimide layers 212, 214, a portion of the lead wires 217*a*-217*j*, and connecting pads 352*a*, 352*b* which connect to the back pads of the piezoelectric elements 205*a*, 205*b*.

The sheet member 219 joins the center member 134, the side members 135*a*, 135*b*, and the back end member 136 which form the support member 132 of the gimbal tongue 223 to improve the vibration characteristics thereof. Further, the sheet member 219 is secured through the flying trace member to the gimbal main body 228. Thus, the trace 201 joins the back side (leading side) of the gimbal tongue 223 and the gimbal main body 228, and supports the back side of the gimbal tongue 223, and, therefore, can act as a limiter for suppressing excessive deformation of the gimbal 202 while loading or unloading.

As was described with reference to FIG. 6, all of the lead wires 217*a*-217*h* from the head slider 105 pass between the front pads of the piezoelectric elements 205*a*, 205*b* (connecting pads 351*a*, 351*b* of the trace) to behind the suspension 110. The lead wires 217*a*-217*h* can be routed without having to widely spread out the trace 201 on the outsides of the piezoelectric elements 205*a*, 205*b* between the connecting pads 351*a*, 351*b* on the front of the piezoelectric elements 205*a*, 205*b* and the connecting pads of the head slider 105.

Thus, the stress from the trace 201 which resists the expansion and contraction of the piezoelectric elements 205*a*, 205*b* can be reduced, and the amount of rotation of the head slider 105 due to the amounts of expansion and contraction of the piezoelectric elements 205*a*, 205*b* can be increased. In addition, the displacement of the head slider 105 can be controlled with high precision by the smooth expansion and contraction actions of the piezoelectric elements 205*a*, 205*b*.

As was described with reference to FIG. 6, the lead wires 217*a*-217*h* detour around and do not pass through the adhesion region 133 of the stage 131. Securing the head slider 105 by an adhesive agent can be strongest when the adhesive agent affixes to the stainless steel layer 202 of the gimbal. Therefore, by having the lead wires 217*a*-217*h* pass outside of the adhesion region, the head slider 105 is strongly affixed, and the adhesion region 133 can be smaller.

Also, the lead wires 217*a*-217*h* pass between the head slider 105 and the stainless steel layer 202 (side opposite the slider air bearing surface) and reach the region between the piezoelectric elements 205*a*, 205*b*. The stress of the trace 201 on the expansion and contraction of the piezoelectric elements 205*a*, 205*b* can be further reduced by extending the lead wires 217*a*-217*h* to the center from the inner side of the head slider 105. In particular, the effect can be heightened by passing the lead wires 217*a*-217*h* in the vicinity of the center of rotation 311 of the head slider 105.

In FIG. 6, the lead wires 217*a*-217*h* are routed below the head slider 105 or above the stage 131 from the back end (leading end) to the front end (trailing end) of the head slider 105. Therefore, the flying trace member is not on the outside of the head slider 105 in front of the back end of the head slider 105. Thus, the stress on the strokes of the piezoelectric elements 205*a*, 205*b* can be reduced, and the drive displacement of the head slider 105 can be increased.

In addition, the lead wires 217*a*-217*h* pass between the front connecting pads (trace connecting pads 351*a*, 351*b*) of the piezoelectric elements 205*a*, 205*b*, spread out to the left and right, and then pass on the outsides of the back pads (connecting pads 352*a*, 352*b*) as the flying wires. Therefore, the gimbal tongue 223 is supported by the trace 201 on the left and right sides. The pitch rigidity of the gimbal tongue 223 can be lowered, and the changes in the flying attitude of the head slider 105 can be smoothly tracked.

Above, the present invention was described with various embodiments, but the various embodiments of the present invention are not limited to the above-mentioned embodiments. A person skilled in the art can easily change, add, and transform each element of the above embodiment within the scope of the present invention. For example, various embodiments can be applied to an HDD in which a magnetic disk rotates clockwise when viewed from the top cover. In this case, the front of the actuator becomes the leading side. The positions in the forward and backward directions of the mutually connecting parts of the front pads of the piezoelectric elements and the connecting pads of the trace are not limited to the positions described above, and may be further in front of the leading end of the head slider, or may be on the trailing side from the center of rotation.

Figure 7:
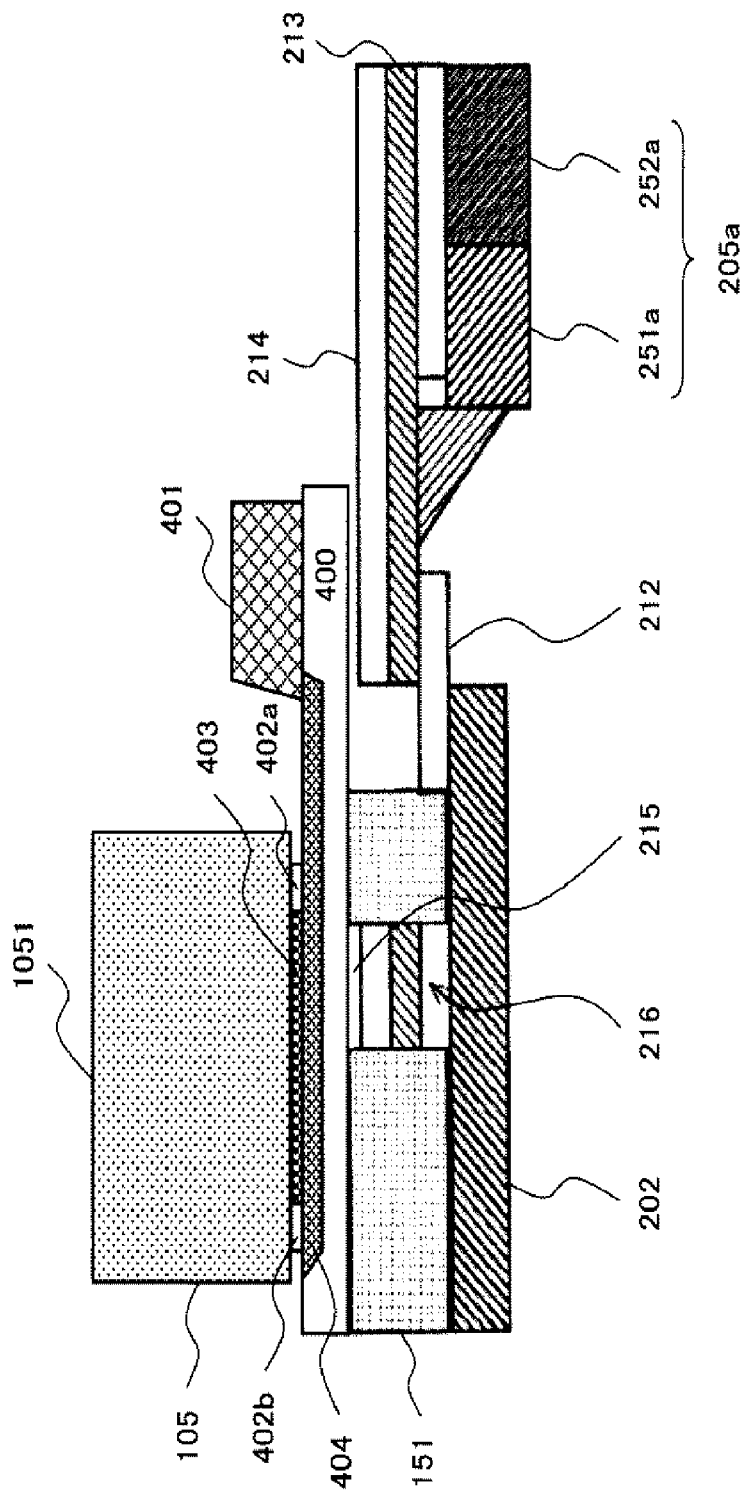
FIG. 7 illustrates a cross-sectional view of the layered structure of the HGA, in accordance with embodiments of the present invention.

Another embodiment is described with reference to FIG. 7. FIG. 7 corresponds to the view in FIG. 4 and is a cross-sectional view schematically showing the layered structure of the HGA. In reference to FIG. 4, the part which mounts the laser diode 401 of the sub-mount 400 was in a stack with the head slider 105 for thermally assisted recording, but as shown in Figure, the laser diode 401 and the head slider 105 do not have to be stacked. In this case, an optical waveguide 404 is provided in the sub-mount 400, and the laser diode 401 and the head slider 105 are optically coupled through the optical waveguide 404. If the laser diode 401 and the head slider 105 are not stacked, the distance of the air bearing surface 1051 of the head slider 105 from the installation surface of the suspension 110 for the head slider 105, namely, the stage 131, can be shorter. If the distance to the air bearing surface 1051 from the stage 131 is short, it is possible to have a smaller conversion rate when the vibration amplitude in the direction perpendicular to the surface of the magnetic disk 101 is converted to a vibration amplitude in the track direction of the head slider 105. Even if the vibration amplitude of the magnetic disk 101 is the same, the mode illustrated in FIG. 7 has a smaller vibration amplitude in the track direction of the head slider 105 than shown in FIG. 4, which is useful in increasing the TPI.

In various embodiments, the lead wires 217a-217h pass between the front terminal of the piezoelectric element 205a and the front terminal of the piezoelectric element 205b. However, even for another wiring layout, an HGA in which the heat generated by the laser diode 401 is difficult to transmit to the piezoelectric elements 205a, 205b, and a disk drive using the same can be implemented.

Various embodiments of the present invention are thus described. While the present invention has been described in particular embodiments, it should be appreciated that the present invention should not be construed as limited by such embodiments, but rather construed according to the following claims.

The invention claimed is:

1. A head gimbal assembly, comprising:
   a gimbal provided with a tongue comprising a stage;
   a sub-mount comprising a laser diode, wherein said laser diode is disposed internally in said sub-mount, and wherein said sub-mount is mounted on said stage;
   a head slider for thermally assisted recording, wherein said head slider is disposed on said sub-mount;
   a first piezoelectric element which expands and contracts in a forward and backward directions, is positioned on a back side opposite a sub-mount installation surface of said stage in said tongue, and comprises a front connecting pad and a back connecting pad;
   a second piezoelectric element which expands and contracts in the forward and backward directions, is positioned in a line with said first piezoelectric element on the back side opposite the sub-mount installation surface of said stage in said tongue, and comprises a front connecting pad and a back connecting pad; and
   a plurality of lead wires formed on said gimbal that comprise one end connected to a connecting pad of said sub-mount, separate to a left and a right in front of said sub-mount, detour around an installation region of said sub-mount and advance to the back, pass between the installation region of said sub-mount and the front connecting pad of said first piezoelectric element and the front connecting pad of said second piezoelectric element and advance to a center, and pass between the front connecting pad of said first piezoelectric element and the front connecting pad of said second piezoelectric element and advance to the back.

2. The head gimbal assembly described in claim 1, wherein a mounting position of said laser diode in said sub-mount is a position which does not overlap said head slider for thermally assisted recording;
   a laser diode installation surface of said sub-mount and the installation surface of said head slider for thermally assisted recording are the same surface; and
   an optical waveguide is provided in said sub-mount, and said laser diode and said head slider for thermally assisted recording are optically coupled through said optical waveguide.

3. The head gimbal assembly described in claim 1, wherein a plurality of lead wires, which pass between an installation region of said sub-mount and the front connecting pad of said first piezoelectric element and the front connecting pad of said second piezoelectric element and advance to the center, and pass between the front connecting pad of said first piezoelectric element and the front connecting pad of said second piezoelectric element and advance to the back, pass below said sub-mount.

4. The head gimbal assembly described in claim 1, wherein said plurality of lead wires passes through a vicinity of a center of rotation of said stage below said head slider for thermally assisted recording.

5. The head gimbal assembly described in claim 1, wherein said gimbal has a main body behind said tongue, said plurality of lead wires separates and spreads out between said first piezoelectric element and said second piezoelectric element, passes on an outside of a back terminal of said first piezoelectric element and the back terminal of said second piezoelectric element, and extends toward said main body.

6. The head gimbal assembly described in claim 5, wherein said plurality of lead wires floats in the space between said tongue and said main body.

7. The head gimbal assembly described in claim 1, wherein said sub-mount is installed on said stage by an adhesive agent having low thermal conductivity.

8. The head gimbal assembly described in claim 1, wherein said sub-mount is constructed from material having high thermal conductivity.

9. The head gimbal assembly described in claim 1, wherein said gimbal has a main body positioned behind said tongue and two arms which extend from said main body toward the front and support both sides of said tongue; and
   said plurality of lead wires extends between said two arms from the connecting pad which is connected to the connecting pad of said head slider for thermally assisted recording to said main body.

10. The head gimbal assembly described in claim 1, wherein said gimbal has a main body positioned behind said tongue and two arms which extend from said main body toward the front and support both sides of said tongue;
   said tongue has a support member which supports said stage on the back of said stage and is connected to said two arms; and
   said plurality of lead wires connects a back end of said support member and said main body.

11. The head gimbal assembly described in claim 10, wherein a limiter connects said stage to each of said two arms and is formed from the same material as an insulating layer covering said plurality of lead wires.

12. The head gimbal assembly described in claim 1, wherein the assembly has a load beam for supporting said gimbal; and a securing point between said gimbal and said load beam is further in front of or in back of said tongue.

13. A disk drive, comprising:
a spindle motor;
a magnetic disk installed on said spindle motor; and
a head gimbal assembly in which recording and reproducing are carried out at any position of said magnetic disk which is rotated by said spindle motor; wherein said head gimbal assembly has
a gimbal provided with a tongue which has a stage;
a sub-mount with a laser diode installed internally which is mounted on said stage;
a head slider for thermally assisted recording which is installed on said sub-mount;
a first piezoelectric element which expands and contracts in a forward and backward directions, is positioned on a back side opposite a sub-mount installation surface of said stage in said tongue, and has a front connecting pad and a back connecting pad;
a second piezoelectric element which expands and contracts in the forward and backward directions, is positioned on a line with said first piezoelectric element on the back side opposite the sub-mount installation surface of said stage in said tongue, and has a front connecting pad and a back connecting pad; and
a plurality of lead wires formed on said gimbal which have one end connected to a connecting pad of said sub-mount, separate to a left and a right in front of said sub-mount, detour around an installation region of said sub-mount and advance to the back, pass between the installation region of said sub-mount and the front connecting pad of said first piezoelectric element and the front connecting pad of said second piezoelectric element and advance to a center, and pass between the front connecting pad of said first piezoelectric element and the front connecting pad of said second piezoelectric element and advance to the back.

14. The disk drive described in claim 13, wherein a plurality of lead wires, which pass between the installation region of said sub-mount and the front connecting pad of said first piezoelectric element and the front connecting pad of said second piezoelectric element and advance to the center, and pass between the front connecting pad of said first piezoelectric element and the front connecting pad of said second piezoelectric element and advance to the back, pass under said sub-mount.

15. The disk drive described in claim 13, wherein said plurality of lead wires passes through a vicinity of a center of rotation of said stage under said head slider for thermally assisted recording.

16. The disk drive described in claim 13, wherein said gimbal has a main body behind said tongue; said plurality of lead wires separates and spreads out to the left and the right between said first piezoelectric element and said second piezoelectric element, passes to the outsides of the back terminal of said first piezoelectric element and the back terminal of said second piezoelectric element, and extend toward said main body.

17. The disk drive described in claim 16, wherein said plurality of lead wires floats in the space between said tongue and said main body.

18. The disk drive described in claim 13, wherein said sub-mount is installed on said stage by an adhesive agent having low thermal conductivity.

19. The disk drive described in claim 13, wherein said sub-mount is constructed from material having high thermal conductivity.

20. The disk drive described in claim 13, wherein said gimbal has a main body positioned behind said tongue and two arms which extend from said main body to the front and support on both sides of said tongue; and
said plurality of lead wires extends between said two arms from the connecting pad which connects to the connecting pad of said head slider for thermally assisted recording to said main body.

* * * * *